United States Patent [19]

Higuchi et al.

[11] Patent Number: 5,785,922
[45] Date of Patent: Jul. 28, 1998

[54] METHOD FOR PRODUCING COMPOSITE SINTERED BODY OF SILICON CARBIDE AND SILICON NITRIDE

[75] Inventors: Yoshikatsu Higuchi; Kazumi Miyake, both of Wako, Japan

[73] Assignee: Honda Giken Kogyo Kabushiki Kaisha, Tokyo, Japan

[21] Appl. No.: 559,001

[22] Filed: Nov. 16, 1995

[30]     Foreign Application Priority Data

Nov. 21, 1994  [JP]  Japan ................................ 6-311233
Dec. 20, 1994  [JP]  Japan ................................ 6-335076

[51] Int. Cl.$^6$ ........................ C04B 35/577; C04B 35/596
[52] U.S. Cl. ........................ 264/682; 264/683; 264/668; 501/89; 501/90; 501/92
[58] Field of Search ........................ 264/65, 682, 683, 264/668; 501/92, 89, 90

[56]           References Cited

U.S. PATENT DOCUMENTS

| 3,833,389 | 9/1974 | Komeya et al. | 106/55 |
| 4,184,882 | 1/1980 | Lange | 106/44 |
| 4,187,116 | 2/1980 | Lange | 106/44 |
| 4,209,474 | 6/1980 | Prochazka | 501/92 |
| 4,690,790 | 9/1987 | Bates | 501/92 |
| 4,800,182 | 1/1989 | Izaki | 501/92 |
| 4,826,791 | 5/1989 | Mehrotra et al. | 501/87 |
| 5,244,621 | 9/1993 | Wakai et al. | 264/65 |

FOREIGN PATENT DOCUMENTS 58-91070  5/1983  Japan .

OTHER PUBLICATIONS

Abstract in English of JP 58–91070.
Article entitled "Densification, Microstrucutre and Properties of SiCN–Nanocomposites", Third Euro–Ceramics, V3 pp. 603–607 (1993) (Freenza Editrice) Communication.
Abstract of JP 2160669 (English).
Abstract of JP 58091070 (English).

Primary Examiner—James Derrington
Attorney, Agent, or Firm—Lyon & Lyon LLP

[57]              ABSTRACT

A composite sintered body of silicon carbide and silicon nitride having a nano-composite structure in which fine SiC particles are dispersed in $Si_3N_4$ particles and grain boundaries and fine $Si_3N_4$ particles are dispersed in SiC particles is produced by (a) adding at least one sintering aid, boron and carbon to a mixed powder of silicon carbide and silicon nitride to form a green body, the sintering aid being (i) $Al_2O_3$ or AlN and/or (ii) at least one oxide of an element selected from Groups 3A and 4A of the Periodic Table, and (b) sintering the green body by HIP or by a high-temperature normal sintering method.

5 Claims, 4 Drawing Sheets

METHOD FOR PRODUCING COMPOSITE SINTERED BODY OF SILICON CARBIDE AND SILICON NITRIDE

BACKGROUND OF THE INVENTION

The present invention relates to a method for producing a composite sintered body of silicon carbide and silicon nitride, particularly to a method for producing a composite sintered body with high density and strength.

Silicon nitride ceramic sintered bodies having high strength, thermal shock resistance, wear resistance, etc. and silicon carbide ceramic sintered bodies having high strength, oxidation resistance, etc. are expected to be used as structural ceramics under severe conditions such as high temperatures. Recently, various attempts have been made to provide, in place of such monolithic substrates, composite sintered bodies of silicon nitride and silicon carbide mixed to a micro-level having advantages of both ingredients, and silicon nitride-silicon carbide composite sintered bodies having nano-composite structures in which fine silicon carbide particles are dispersed in silicon nitride particles.

Japanese Patent Laid-Open No. 58-91070 discloses a composite sintered body of silicon nitride and silicon carbide formed by adding boron, carbon and an inorganic oxide as sintering aids to a mixed powder of silicon nitride and silicon carbide, mixing and sintering them. This composite sintered body may be produced by normal sintering or hot-pressing of fine mixed powder of silicon nitride and silicon carbide in the presence of the sintering aid at 1500°–2300° C. However, this reference fails to specifically teach the simultaneous addition of boron, carbon and an inorganic oxide. In this method, the composite sintered body would practically have to be produced by hot pressing, failing to provide sintered articles with complicated shapes.

Japanese Patent Laid-Open No. 2-160669 discloses the production of a silicon nitride-silicon carbide composite sintered body from amorphous silicon nitride-silicon carbide composite powder obtained by a gas phase reaction method, the silicon nitride-silicon carbide composite sintered body having a fine structure in which silicon carbide particles having an average particle size of 1 μm or less are present along grain boundaries and silicon carbide particles as small as several nanometers to several hundreds of nanometers are dispersed in silicon nitride particles. However, since the amorphous silicon nitride-silicon carbide composite powder is decomposed during sintering, it is not easily subjected to a liquid-phase sintering. Also, since the amorphous silicon nitride-silicon carbide composite powder is extremely bulky, it is not easily molded. Accordingly, the amorphous silicon nitride-silicon carbide composite powder should practically be sintered by hot pressing.

OBJECT AND SUMMARY OF THE INVENTION

Accordingly, an object of the present invention is to provide a method for producing a composite sintered body of silicon carbide and silicon nitride with high density and excellent high-temperature strength.

As a result of research in view of the above objects, the inventors have found that by adding particular additives to a mixed powder of silicon carbide and silicon nitride and carrying out a normal sintering at a high temperature or HIP, a composite sintered body of silicon carbide and silicon nitride with high density and strength can be produced. The present invention has been completed based on this finding.

Thus, the first method for producing a composite sintered body of silicon carbide and silicon nitride comprises the steps of (a) adding at least one sintering aid, boron and carbon to a mixed powder of silicon carbide and silicon nitride to form a green body, the sintering aid being (i) aluminum oxide or aluminum nitride and/or (ii) at least one oxide of an element selected from Groups 3A and 4A of the Periodic Table, and (b) sintering the green body by HIP.

The second method for producing a composite sintered body of silicon carbide and silicon nitride comprises the steps of (a) adding at least one sintering aid, boron and carbon to a mixed powder of silicon carbide and silicon nitride to form a green body, the sintering aid being (i) aluminum oxide or aluminum nitride and/or (ii) at least one oxide of an element selected from Groups 3A and 4A of the Periodic Table, and (b) sintering the green body at a temperature of 2000° C. or higher and an atmosphere gas pressure of 50 kgf/cm² or lower.

DETAILED DESCRIPTION OF THE PREFERRED EMBODIMENTS

Figure 1:
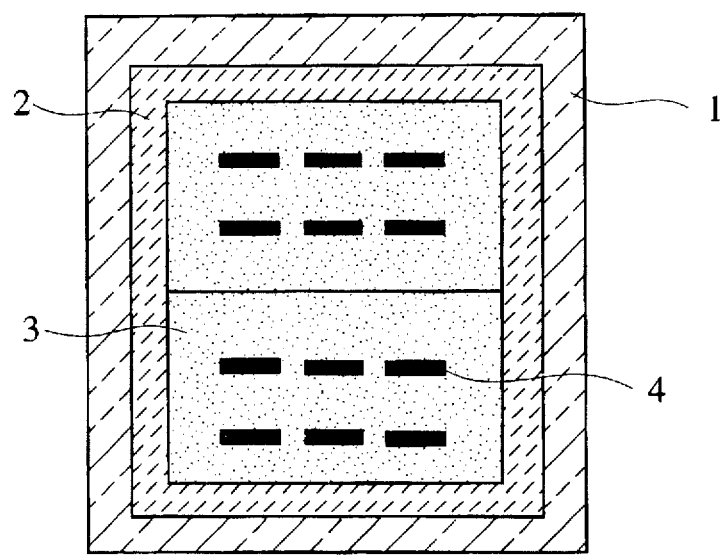
FIG. 1 is a cross-sectional view schematically showing a HIP-sintering crucible for use in the production of the composite sintered body of silicon carbide and silicon nitride according to the present invention.

The present invention will be explained in detail below by reference to specific materials and processes for Examples of the present invention and also non-inventive Comparative Examples.

[1] Starting material (1) $Si_3N_4$ powder

The silicon nitride ($Si_3N_4$) powder used in the present invention preferably has an average particle size of 0.01–1 μm, particularly 0.1–0.8 μm. The amount of $Si_3N_4$ powder is preferably 50–85 weight %, more preferably 70–80 weight % based on the total amount (100 weight %) of silicon carbide and silicon nitride. If the amount of $Si_3N_4$ powder exceeds 80 weight % (if a ratio of $Si_3N_4$ powder to silicon carbide is too high), the effects of adding silicon carbide to the $Si_3N_4$ powder would undesirably decrease.

(2) SiC powder

The silicon carbide (SiC) powder used in the present invention preferably has an average particle size of 0.01–1 μm, particularly 0.08–0.8 μm. The amount of silicon carbide powder is preferably 15–50 weight %, more preferably 20–30 weight % based on the total amount (100 weight %) of silicon carbide and silicon nitride. If the amount of silicon carbide powder exceeds 50 weight %, the resultant composite sintered body would not have high-density.

(3) Sintering aid powder

The sintering aid powder comprises (i) aluminum oxide or aluminum nitride, and/or (ii) at least one oxide of an element selected from Groups 3A and 4A of the Periodic Table.

Between $Al_2O_3$ and AlN, $Al_2O_3$ is more preferable. Another sintering aid is at least one of the oxides of elements selected from Groups 3A of the Periodic Table such as $Y_2O_3$, $Yb_2O_3$, $Er_2O_3$, etc. and the oxides of elements selected from Groups 4A of the Periodic Table such as $ZrO_2$, $HfO_2$, etc., preferably $Y_2O_3$. A preferred combination is one of $Al_2O_3$ and AlN and an inorganic oxide of an element in Group 3A or 4A, and a more preferred combination is $Al_2O_3$ and $Y_2O_3$. The The total amount of the sintering aid is preferably 15 weight % or less, more preferably 8 weight % or less based on the total amount (100 weight %) of silicon carbide and silicon nitride. If the sintering aid powder is more than 15 weight %, the resultant sintered body has a low high-temperature strength. When (a) one of $Al_2O_3$ and AlN is added together with (b) at least one oxide of an element selected from Groups 3A and 4A of the Periodic Table, a weight ratio of the total amount of (a) $Al_2O_3$ and AlN to the total amount of (b) oxides of elements selected from Groups 3A and 4A of the Periodic Table is preferably 2:1–1:15.

(4) Boron

As long as boron is in the form of fine powder, it may be in any type though its preferred type is amorphous powder. The boron powder has an average particle size of 1 μm or less, more preferably 0.8 μm or less.

(5) Carbon

Carbon powder used in the present invention is not restricted to a particular type as long as it is fine powder. The carbon powder may preferably be graphite powder or carbon black powder such as acetylene black, Ketchen black, etc., and the graphite powder is particularly preferable. The carbon powder has an average particle size of 5 μm or less, more preferably 1 μm or less. If the average particle size of the carbon powder exceeds 5 μm, the carbon powder cannot be uniformly dispersed.

The total amount of boron and carbon is preferably 0.3–5.0 weight %, more preferably 1–3 weight % based on the total amount (100 weight %) of silicon carbide and silicon nitride. If the total amount of boron and carbon is more than 5 weight %, the resultant composite sintered body would have a low density.

[2] Production of composite sintered body (1) Formation of green body

Each component is added in a proportion as described above, and fully blended by a ball mill, a kneader, etc. The blending of the components may be conducted in a dry or wet manner. In the case of dry blending, the powder mixture then is mixed with water and a dispersion medium such as ethanol, butanol, etc. Also, in the case of injection molding, a proper organic or inorganic binder is added. The preferred organic binders include, for instance, ethyl silicate, polyethylene glycol, polyvinyl alcohol (PVA), an acrylic emulsion, a polyurethane emulsion, etc.

The green body may be produced by die molding, etc. When a green body with a complicated shape is to be formed, a slip casting or an injection molding are preferable.

(2) Sintering (a) HIP (Hot isostatic pressing)

In the first embodiment, the green body is preferably sintered by HIP to provide a high sintered density. The sintering temperature is 1700°–2200° C., preferably 1750°–2000° C. If the sintering temperature is lower than 1700° C., the resultant sintered body would have low strength and toughness. On the other hand, if the sintering temperature exceeds 2200° C., $Si_3N_4$ starts to decompose. The sintering is conducted in a non-oxidizing atmosphere, preferably a nitrogen gas atmosphere. In this case, the atmosphere gas pressure is preferably about up to 2000 kgf/cm$^2$, and the sintering time is preferably about 1–5 hours.

The green body is preferably embedded in accompanying powder (preferably BN powder) in a crucible for sintering. The crucible is preferably a BN crucible, a carbon crucible, a composite crucible of a carbon crucible and a BN crucible disposed inside the carbon crucible, etc., and the composite crucible is particularly preferable.

(b) Gas pressure sintering

In the second embodiment, the green body is preferably sintered at an atmosphere gas pressure of 50 kgf/cm$^2$ or lower. The sintering temperature is 2000° C. or higher, preferably a temperature between 2050° C. and a decomposition temperature of silicon nitride at the selected atmosphere gas pressure. If the sintering temperature is lower than 2000° C., the resultant sintered body would have low strength and toughness. The sintering is conducted in a non-oxidizing atmosphere, preferably a nitrogen gas atmosphere. In this case, the atmosphere gas pressure is preferably about 1–10 kgf/cm$^2$ for the purpose of using a simpler apparatus, and the sintering time is preferably about 1–5 hours. The green body is preferably embedded in accompanying powder (preferably BN powder) in a crucible for sintering. The crucible is preferably made of BN, carbon, etc., and the BN crucible is particularly preferable.

(c) Composite sintered body

In the composite sintered body of silicon carbide and silicon nitride obtained by the above method, fine SiC particles are dispersed in $Si_3N_4$ particles and grain boundaries, and fine $Si_3N_4$ particles are dispersed in SiC particles, constituting a so-called nano-composite structure. Since the SiC particles have a larger thermal expansion coefficient than the $Si_3N_4$ particles, the SiC particles act to provide a residual compression stress in the $Si_3N_4$ particles. Also, the fine SiC particles dispersed in the grain boundaries of the $Si_3N_4$ particles function as wedges to suppress the sliding of the $Si_3N_4$ particles along the grain boundaries.

The present invention will be explained in further detail by the following Examples without intention of restricting the scope of the present invention defined by the claims attached hereto.

EXAMPLES 1–5 AND COMPARATIVE EXAMPLES 1–7

$Si_3N_4$ powder having an average particle size of 0.1 μm, SiC powder having an average particle size of 0.2 μm, $Y_2O_3$ powder having an average particle size of 1.4 μm, $Al_2O_3$ powder having an average particle size of 0.8 μm, boron powder having an average particle size of 0.8 μm and carbon powder having an average particle size of 1 μm were mixed in proportions shown in Table 1. Each mixture was introduced into a 2-liter mono-pot together with 300 g of ethanol and 600 g of silicon nitride balls to carry out ball-milling with ethanol as a dispersion medium for 64 hours. By removing the ethanol by drying, mixed powder samples were obtained.

TABLE 1

| No. | Mixed Powder | | Sintering Aid | | | |
|---|---|---|---|---|---|---|
| | Si₃N₄ | SiC | Y₂O₃ | Al₂O₃ | B | C |
| Example | | | | | | |
| 1 | 70 | 30 | 6 | 2 | 1.5 | 3 |
| 2 | 70 | 30 | 6 | 2 | 1 | 2 |
| 3 | 70 | 30 | 6 | 2 | 0.5 | 1 |
| 4 | 70 | 30 | 6 | 2 | 0.3 | 0.6 |
| 5 | 70 | 30 | 6 | 2 | 0.1 | 0.2 |
| Comparative Example | | | | | | |
| 1 | 70 | 30 | 6 | 2 | 0 | 0 |
| 2 | 90 | 10 | 6 | 2 | 1 | 2 |
| 3 | 90 | 10 | 6 | 2 | 0.5 | 1 |
| 4 | 90 | 10 | 6 | 2 | 0.3 | 0.6 |
| 5 | 90 | 10 | 6 | 2 | 0.1 | 0.2 |
| 6 | 90 | 10 | 6 | 2 | 0 | 0 |
| 7 | 90 | 0 | 0 | 1 | 2 | |

Note
Unit: the units above are the weight % based on the total amount of silicon carbide and silicon nitride.

Each sample powder was pre-molded by a die press at 200 kgf/cm², and then subjected to CIP at an isostatic pressure of 4 tons/cm² to form a green body of 30 mm×50 mm×6 mm. Each green body 4 was embedded in accompanying powder 3 in a BN crucible 2 and placed in a carbon crucible 1 as shown in FIG. 1 to carry out a HIP sintering in a nitrogen gas atmosphere at 1000 atms and 1850° C., thereby producing a composite sintered body of silicon carbide and silicon nitride.

The density of each resultant composite sintered body was measured by an Archimedean method to determine a relative density thereof. According to JIS R-1601, each sintered body was cut to 3 mm×4 mm×40 mm to carry out a three-point bending test at room temperature under the condition of a 30-mm span and a cross head speed of 0.5 mm/minute. The results are shown in Table 2.

TABLE 2

| No. | Density (g/cm³) | Relative Density (%) | Bending Strength[1] (MPa) |
|---|---|---|---|
| Example | | | |
| 1 | 3.23 | 99 | 830 |
| 2 | 3.24 | 99 | 842 |
| 3 | 3.26 | 99 | 837 |
| 4 | 3.20 | 97 | 811 |
| 5 | 3.25 | 98 | 810 |
| Comparative Example | | | |
| 1 | 3.07 | 93 | 506 |
| 2 | 3.21 | 98 | 643 |
| 3 | 3.23 | 98 | 493 |
| 4 | 3.26 | 99 | 684 |
| 5 | 3.27 | 99 | 409 |
| 6 | 3.26 | 99 | 485 |
| 7 | 2.53 | 80 | Not measured |

Note
[1]Three-point bending strength measured at room temperature.

As is clear from Table 2, the three-point bending strength of the composite sintered bodies of Comparative Example 1 in which boron and carbon were not added and Comparative Examples 2–6 in which the amount of silicon carbide was less than 15 weight % was lower than that of Examples 1–5. Also, in Comparative Example 7 in which only boron and carbon were added, sintering could not be attained by HIP.

Figure 3:
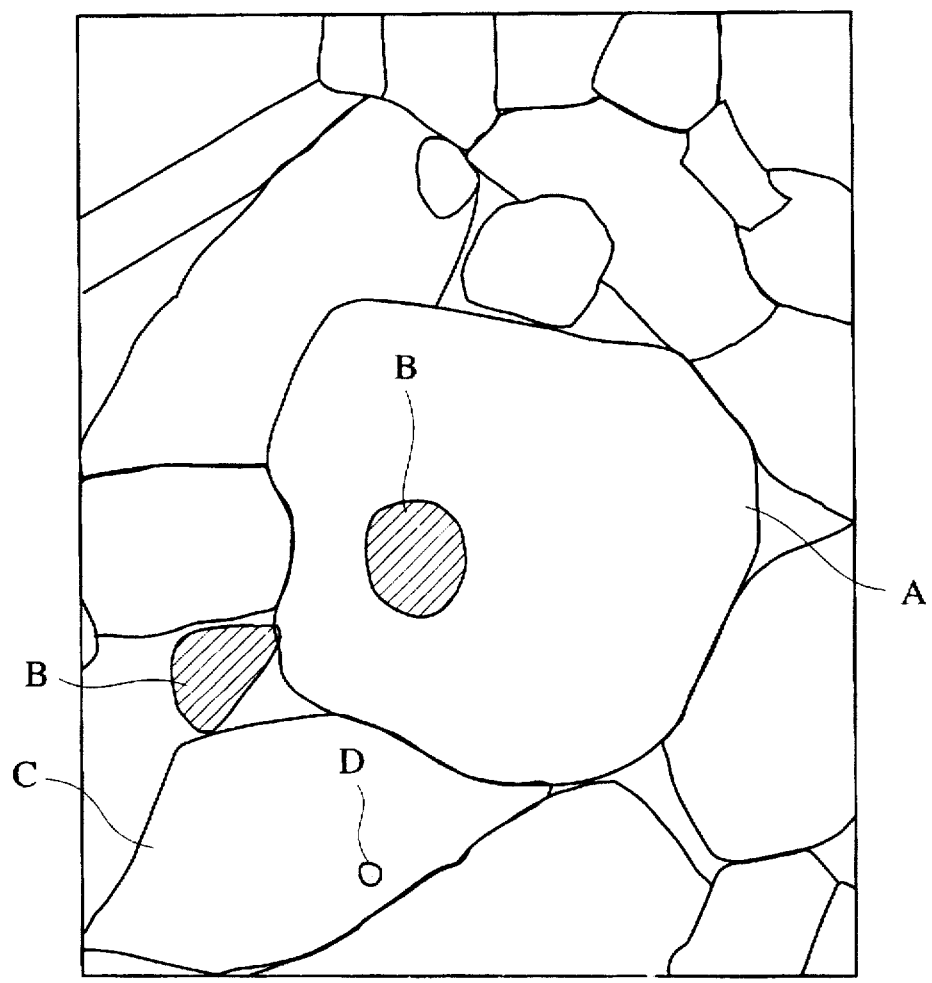
FIG. 3 is a schematic view showing one example of the structure of the composite sintered body of silicon carbide and silicon nitride according to the present invention.

FIG. 3 is a schematic view showing a photomicrograph (magnification: 100,000, measured by a microscope of Nippon Densi K. K.) of the sintered body of Example 2. In the sintered body, fine SiC particles (B) were dispersed in Si₃N₄ particles (A) and grain boundaries and fine Si₃N₄ particles (D) were dispersed in SiC particles (C).

EXAMPLES 6 AND 7

Si₃N₄ powder having an average particle size of 0.1 μm, SiC powder having an average particle size of 0.2 μm, Y₂O₃ powder having an average particle size of 1.4 μm, Al₂O₃ powder having an average particle size of 0.8 μm, boron powder having an average particle size of 0.8 μm and carbon powder having an average particle size of 1 μm were mixed in proportions shown in Table 3 below to prepare 4 types of mixtures. Each mixture was introduced into a 2-liter monopot together with 300 g of ethanol and 600 g of silicon nitride balls to carry out ball-milling with ethanol as a dispersion medium for 64 hours. After removal of the ethanol by drying, 4 types of sample powder (Samples 1–4) as shown in Table 3 were obtained.

Figure 2:
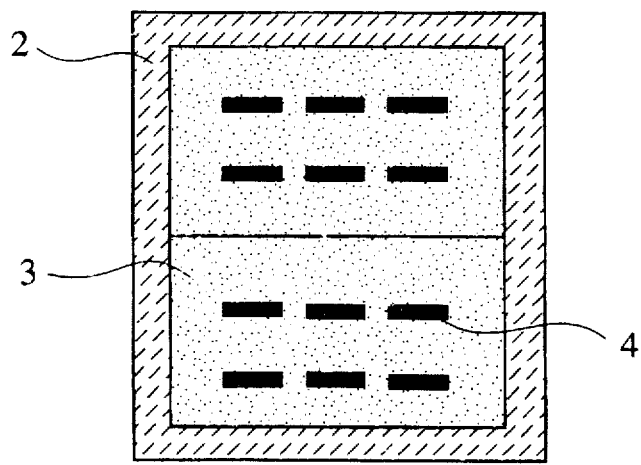
FIG. 2 is a cross-sectional view schematically showing a different crucible for use in the production of the composite sintered body of silicon carbide and silicon nitride by gas pressure sintering according to the present invention.
Figure 4:
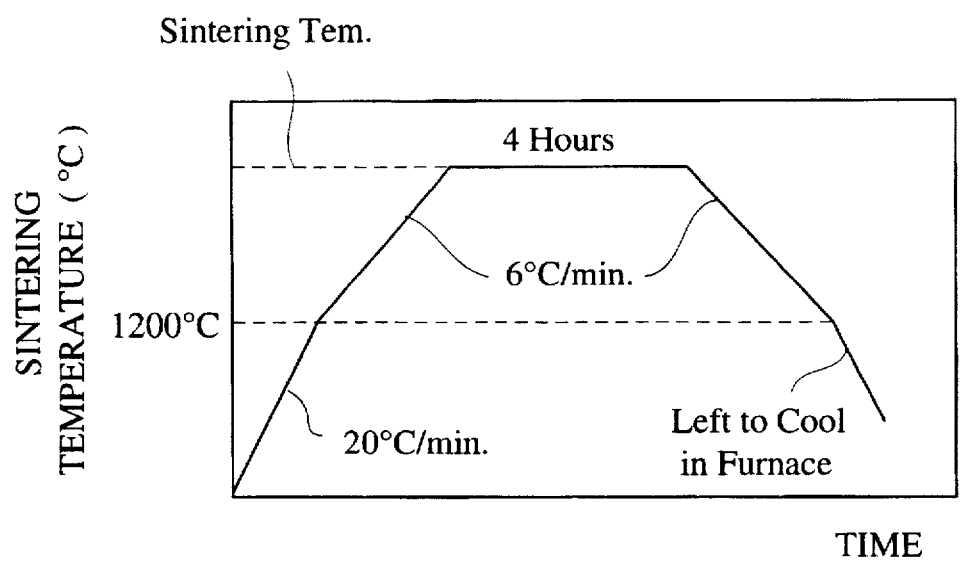
FIG. 4 is a graph showing the temperature and pressure conditions in the sintering of a green body of silicon carbide and silicon nitride in one example of the present invention, numbers therein denoting a heating speed, a cooling speed and temperature hold time.
Figure 5:
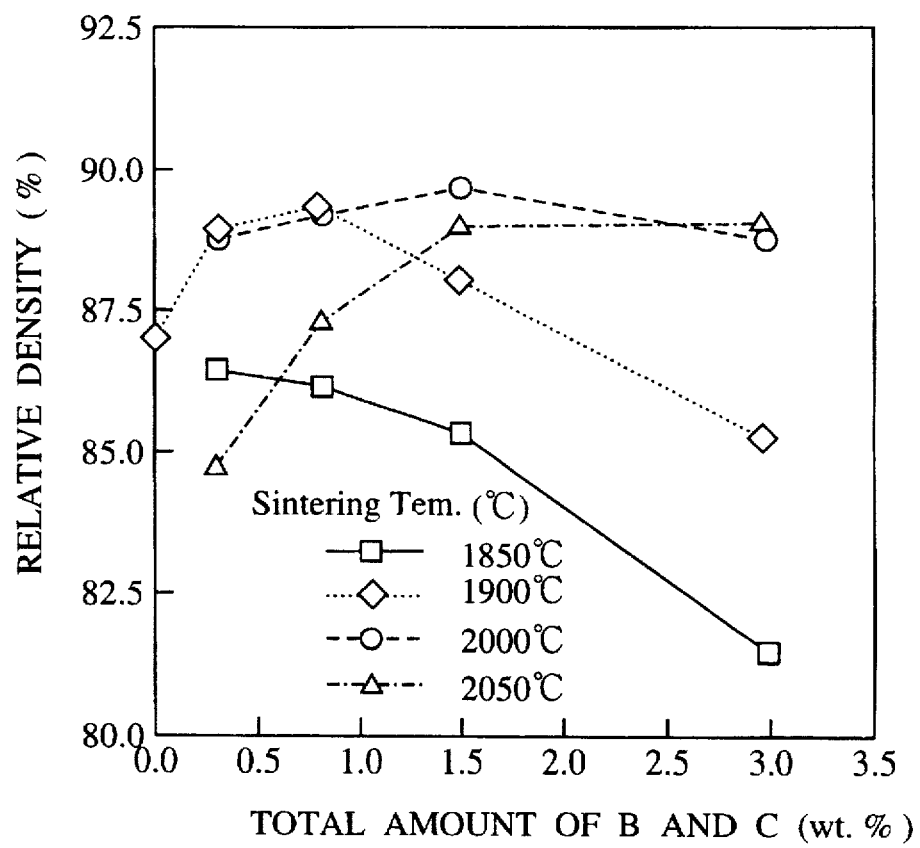
FIG. 5 is a graph showing the relation between a relative density of a composite sintered body of silicon carbide and silicon nitride and the total amount of boron and carbon in Examples 6 and 7 and Comparative Examples 8 and 9.

Each sample powder was pre-molded by a die press at 200 kgf/cm², and then subjected to CIP at an isostatic pressure of 4 tons/cm² to form a green body of 30 mm×50 mm×6 mm. Each green body 4 was embedded in accompanying powder 3 in a BN crucible 2 as shown in FIG. 2 and sintered at 2000° C. (Example 6) or 2050° C. (Example 7) in a nitrogen gas atmosphere at 9 kgf/cm² according to a sintering pattern shown in FIG. 4 to produce a composite sintered body of silicon carbide and silicon nitride. The density of each resultant composite sintered body was measured by an Archimedean method to determine a relative density thereof. The results are shown in FIG. 5.

COMPARATIVE EXAMPLES 8 AND 9

In the same manner as in Examples 6 and 7, five types of sample powder (Samples 1–5) having compositions shown in Table 3 were prepared, and each sample powder was pre-molded and subjected to CIP to form a green body of 30 mm×50 mm×6 mm. Each green body 4 was embedded in accompanying powder 3 in a BN crucible 2 as shown in FIG. 2 and sintered at 1850° C. (Comparative Example 8) or 1900° C. (Comparative Example 9) in a nitrogen gas atmosphere at 9 kgf/cm² according to a sintering pattern shown in FIG. 4 to produce a composite sintered body of silicon carbide and silicon nitride. The density of each resultant composite sintered body was measured by the same method as in Examples 6 and 7 to determine a relative density thereof. The results are shown in FIG. 5.

TABLE 3

| Sample No. | Mixed Powder | | Sintering Aid | | | |
|---|---|---|---|---|---|---|
| | Si₃N₄ | SiC | Y₂O₃ | Al₂O₃ | B | C |
| 1 | 70 | 30 | 6 | 2 | 1 | 2 |
| 2 | 70 | 30 | 6 | 2 | 0.5 | 1 |
| 3 | 70 | 30 | 6 | 2 | 0.3 | 0.6 |
| 4 | 70 | 30 | 6 | 2 | 0.1 | 0.2 |
| 5 | 70 | 30 | 6 | 2 | 0 | 0 |

Note
Unit: the units above are the weight % based on the total amount of silicon carbide

COMPARATIVE EXAMPLES 10–13

In the same manner as in Examples 6 and 7, five types of sample powder (Samples 6–10) having compositions shown in Table 4 were prepared, and each sample powder was pre-molded and subjected to CIP to form a green body of 30 mm×50 mm×6 mm.

TABLE 4

| Sample | Mixed Powder | | Sintering Aid | | | |
|---|---|---|---|---|---|---|
| No. | $Si_3N_4$ | SiC | $Y_2O_3$ | $Al_2O_3$ | B | C |
| 6 | 90 | 10 | 6 | 2 | 1 | 2 |
| 7 | 90 | 10 | 6 | 2 | 0.5 | 1 |
| 8 | 90 | 10 | 6 | 2 | 0.3 | 0.6 |
| 9 | 90 | 10 | 6 | 2 | 0.1 | 0.2 |
| 10 | 90 | 10 | 6 | 2 | 0 | 0 |

Note
the unites above are in weight % based on the total amount of silicon carbide and silicon nitride.

Figure 6:
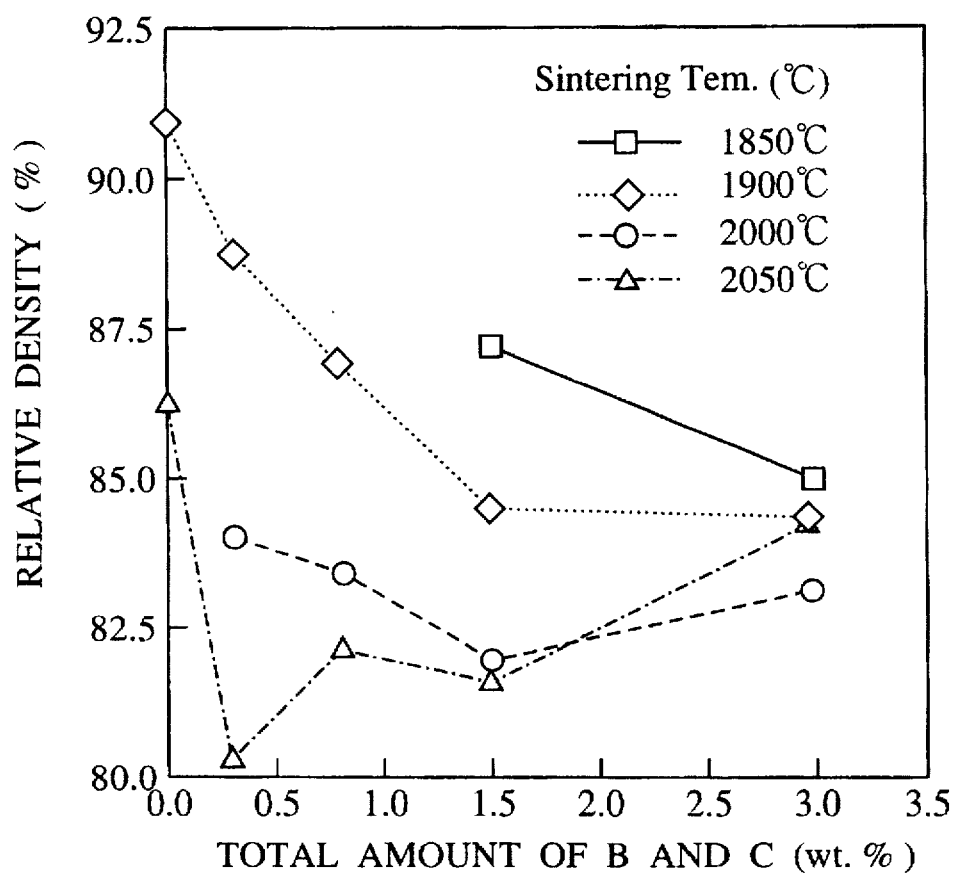
FIG. 6 is a graph showing the relation between a relative density of a composite sintered body of silicon carbide and silicon nitride and the total amount of boron and carbon in Comparative Examples 10–13.

Each green body 4 was embedded in accompanying powder 3 in a BN crucible 2 as shown in FIG. 2 and sintered at 1850° C. (Comparative Example 10), 1900° C. (Comparative Example 11), 2000° C. (Comparative Example 12) or 2050° C. (Comparative Example 13) in a nitrogen gas atmosphere at 9 kgf/cm² according to a sintering pattern shown in FIG. 4 to produce a composite sintered body of silicon carbide and silicon nitride. The density of each resultant composite sintered body was measured by the same method as in Examples to determine a relative density thereof. The results are shown in FIG. 6.

As shown in FIG. 5, in Comparative Examples 8 and 9 in which sintering was conducted at a temperature lower than 2000° C., the composite sintered bodies had relative densities that decreased substantially as the total amount of boron and carbon increased. Also, in Comparative Examples 10-13 in which the silicon carbide content was 10 weight %, the resultant composite sintered bodies had generally lower relative densities than those of Examples 6 and 7 as shown in FIGS. 5 and 6.

As described in detail above, by using silicon carbide, silicon nitride and particular sintering aids and sintering by HIP or by gas pressure sintering at 50 kgf/cm² or lower, it is possible to obtain a composite sintered body having a nano-composite structure in which fine SiC particles are dispersed in $Si_3N_4$ particles and grain boundaries and fine $Si_3N_4$ particles are dispersed in SiC particles. Accordingly, the composite sintered body obtained by the method of the present invention has high density and excellent high-temperature strength. The composite sintered body of silicon carbide and silicon nitride having such properties are suitable for sliding members, etc. usable at high temperatures.

What is claimed is:

1. A method for producing a composite sintered body of silicon carbide and silicon nitride, comprising the steps of:

(a) adding sintering aid powder, boron powder and carbon powder to a mixture of 15-50 weight % of silicon carbide powder and 85-50 weight % of silicon nitride powder to form a green body, said sintering aid powder being a mixture of (i) aluminum oxide or aluminum nitride, and (ii) at least one oxide of an element selected from the group consisting of $Y_2O_3$, $Yb_2O_3$, $Er_2O_3$, $ZrO_2$ and $HfO_2$, with a weight ratio of said (i) to said (ii) being from 2:1 to 1:15, and (b) subjecting said green body to a HIP sintering at an atmosphere gas pressure of 1033-2000 kgf/cm².

2. The method for producing a composite sintered body of silicon carbide and silicon nitride according to claim 1, wherein the amount of said sintering aid powder is 15 weight % or less, and the total amount of said boron powder and carbon powder is 0.3-5 weight %, based on the total amount (100 weight %) of said silicon carbide powder and said silicon nitride powder.

3. The method for producing a composite sintered body of silicon carbide and silicon nitride according to claim 1 or 2, wherein the HIP sintering is conducted at a temperature of 1700° C. or higher.

4. A method for producing a composite sintered body of silicon carbide and silicon nitride, comprising the steps of:

(a) adding at least one sintering aid powder, boron powder and carbon powder to a mixture of 5-50 weight % of silicon carbide powder and 85-50 weight % of silicon nitride powder to form a green body, said sintering aid powder being a mixture of (i) aluminum oxide or aluminum nitride, and (ii) at least one oxide of an element selected from the group consisting of $Y_2O_3$, $Yb_2O_3$, $Er_2O_3$, $ZrO_2$ and $HfO_2$, with a weight ratio of said (i) to said (ii) being from 2:1 to 1:15, and (b) subjecting said green body to a gas pressure sintering at a temperature of 2000° C. or higher and an atmosphere gas pressure of 9-50 kgf/cm².

5. The method for producing a composite sintered body of silicon carbide and silicon nitride according to claim 4, wherein the amount of said sintering aid powder is 15 weight % or less, and the total amount of said boron powder and carbon powder is 0.3-5 weight %, based on the total amount (100 weight %) of said silicon carbide powder and said silicon nitride powder.

* * * * *